June 6, 1967  J. B. MASON  3,323,841
CRAWLER TRACTOR IDLER AND ROLLER MOUNTING
Filed Oct. 23, 1965
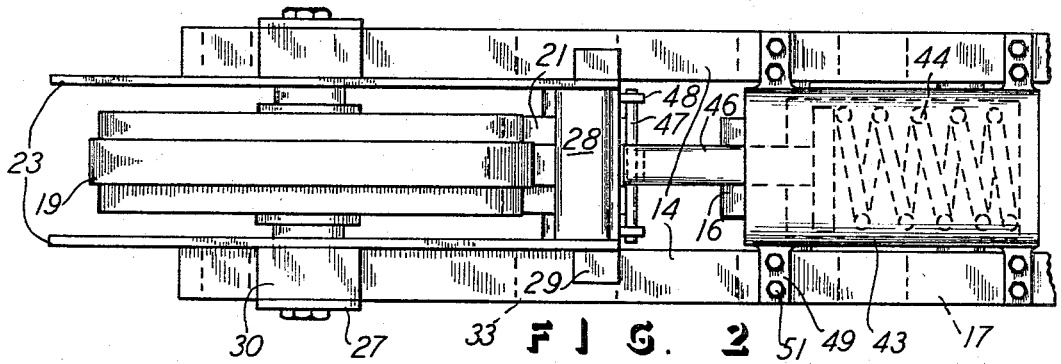
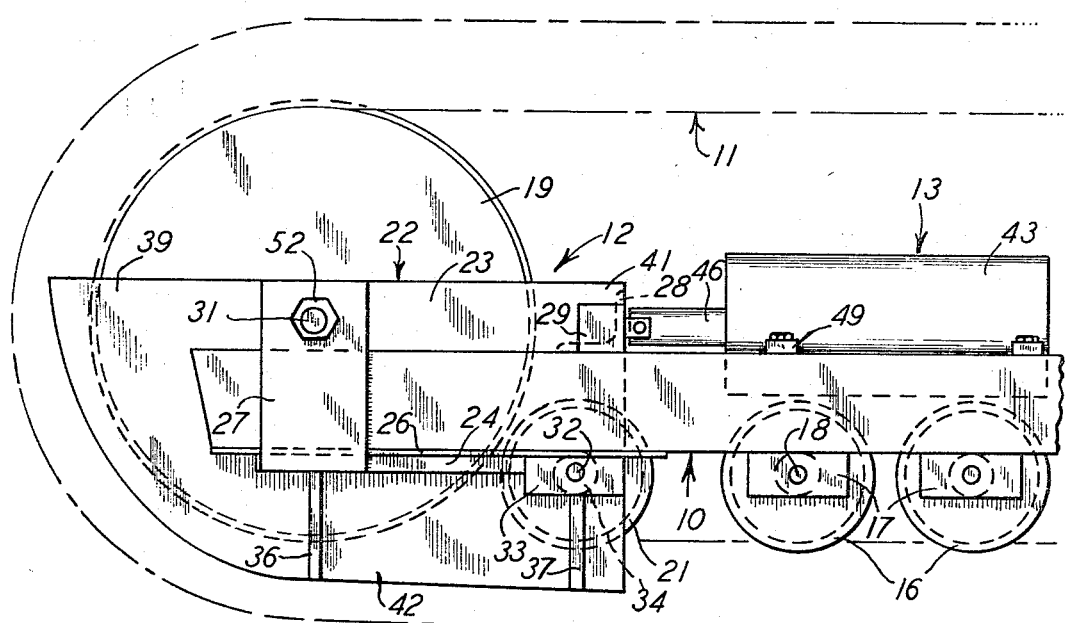
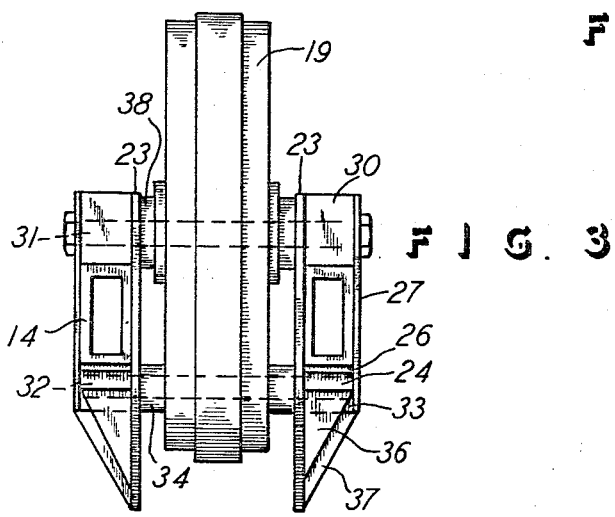
INVENTOR:
JOHN B. MASON
ATTORNEY

United States Patent Office 3,323,841
Patented June 6, 1967

3,323,841
CRAWLER TRACTOR IDLER AND ROLLER MOUNTING
John B. Mason, Burlington, Iowa, assignor to J. I. Case Company, Racine, Wis., a corporation of Wisconsin
Filed Oct. 23, 1965, Ser. No. 503,879
4 Claims. (Cl. 305—22)

ABSTRACT OF THE DISCLOSURE

A track chain mounting for supporting a crawler tractor and having a slidable mounting bracket which rotatably supports an idler wheel and a first roller whereon the track chain is trained. Side plates are included in the mounting bracket, and they are available for laterally guiding the track chain. A resilient member is connected with the mounting bracket for urging it and the idler wheel to a position to keep the track chain taut.

---

This invention relates to a crawler tractor idler wheel and roller mounting.

Crawler tractors employing chain tracks which are endless and mounted on a drive sprocket and an idler wheel and intervening rollers are already well known in the crawler tractor art. Further, it is common practice to have the idler wheel movably mounted so that a recoil means can be applied against the idler wheel to accommodate variations in the tension existing in the chain track. That is, when the tractor encounters conditions which require the chain track to be placed under a severe tension or driving requirement, the idler wheel is permitted to retract to compensate for the tension so that the chain is not broken or otherwise damaged. Generally, a recoil mechanism of either a spring or a fluid means is employed as an accumulator to resiliently urge the idler wheel into a position which maintains the chain track taut, but it of course also permits the idler wheel to retract, as mentioned.

In view of this state of the art, it is a general object of this invention to provide an improved mounting for the idler wheel and roller, and to also improve the relationship of the connection between the track frame and the idler wheel and roller to obtain optimum conditions for transfering the supporting force from the idler wheel and the roller to the track frame.

A more specific object of this invention is to provide a unitized assembly of an idler wheel, track roller, and chain guide, all of which is movable in accordance with the driving tension in the chain track, and which provides an improved means for supporting and guiding the chain track so that it is less subject to damage and is efficient in its function of drivingly supporting the tractor.

Still a more specific object of this invention is to provide an arrangement for supporting a chain track in a manner to eliminate the buckling of the chain track at a point immediately behind the idler wheel and at the time when the chain track is placed under a condition of high tension.

Other objects and advantages become apparent upon reading the following description in light of the accompanying drawings, wherein:

FIG. 1 is a side elevational view of a preferred embodiment of this invention and showing a fragment of the crawler tractor track with the track itself shown in dot-dash lines.

FIG. 2 is a top plan view of FIG. 1 but without the inclusion of the track.

FIG. 3 is a front elevational view of FIG. 2 with the recoil mechanism removed.

The drawings generally show a track frame 10, a chain track 11, an assembly 12, and a recoil means 13. The track frame 10 consists of the two rectangularly shaped tube members 14 which extend in the fore-and-aft direction of movement of the crawler tractor supported by the members 14. It of course is understood that the drawings show the assembly for one side of the tractor, and there would be a like assembly for the other side. Also, the drawings show only the forward end of the track assembly, and the rearward end, including the driving wheel, is not shown since such showing is not necessary for one skilled in the art. Also, the track 11 is of the chain type and is shown only in the dot-dash lines in FIG. 1, but it will be understood by one skilled in the art what the construction of the track 11 is, and reference may also be had to U.S. Patent 1,442,569 showing a chain track. Of course the chain track 11 is of an endless type and is driven by the usual driving sprocket (not shown) for the well-known purpose of advancing the crawler tractor in either the forward or rearward direction.

A plurality of rollers 16 are rotatably mounted on the frame members 14 by means of mounting blocks 17 disposed below the members 14 to support the latter from below. The rollers 16 are of course spaced along the track frame 10 to movably support the track 11 in the well-known manner. The rollers are also shown to have shafts 18 which of course serve as axles for the rollers 16 in the rotation of the rollers 16.

The assembly 12 also supports the chain track 11, and the assembly includes the idler wheel 19 and the track roller 21. The idler wheel 19 and roller 21 of course provide movable supports for the track 11 which is trained over these two members which are located at the forward end of the frame 10.

An important feature is that the idler wheel 19 and the roller 21 are mounted in a manner to have them both be movable with respect to the frame 10 and to be movable together as a unit. To accomplish this, a mounting bracket, generally designated 22, is provided and it presents the supports for the idler wheel 19 and the roller 21 so that both are rotatable in response to the linear movement of the track 11. FIGS. 2 and 3 show that the mounting bracket 22 includes two plate members 23 disposed on opposite sides of the idler wheel 19 and thus the roller 21, since the wheel 19 and the roller 21 are in alignment or tandem relation. The mounting bracket 22 also includes a connecting bar 24, a plate 26, a side plate 27, and an angle piece 28 which is shown in FIG. 2 to extend between the plates 23. These members of the mounting bracket 22 are of course fastened together in any conventional manner, such as by welding or the like, and they therefore form a rigid unit or assembly. Finally, blocks 29 and 30 are also included in the mounting bracket 22 and are disposed above the frame members 14 to complete the encirclement of the frame members 14 by the mounting bracket 22.

One reason for the arrangement of the mounting bracket 22 as shown, is that the bracket 22 is slidable on the track frame 10 in the longitudinal direction of the frame members 14. This of course means that the chain track 11 can vary in its overall extent from front end to rear end in an amount determined by the particular location of the assembly 12 with respect to the frame 10. This is somewhat customary in the art, that is, to have the idler wheel slidable on the track frame to accommodate the chain track.

The idler wheel 19 is rotatably supported in the bracket 22 by a shaft 31 extending between the plates 23. Likewise, the roller 21 is rotatably supported by a shaft 32 extending between the plates 23. The roller shaft 32 is also shown to have the supporting blocks 33 and the bushings 34 thereon. The block 33 is disposed below the track frame 10 to support the latter from below, and this is the optimum position of support for the track frame 10. Likewise, the idler wheel 19 is related to the track frame 10 to support the frame members 14 from below, and both of the supports for the roller 21 and the idler wheel 19 are through the plate member 24 and the plate 26, both of which are below the frame members 14. Gusset plates 36 and 37 are also shown to extend from the plate 24 to the plate 23 and from the support block 33 to the plate 23, respectively.

Bushings 38 are interposed between the plates 23 and the idler wheel 19 to space the latter between the plates 23. Of course it will also now be appreciated that the plates 23 have forward portions 39, rearward portions 41, and lower portions 42, all with respect to the central portion which is located aligned with the axis of the idler wheel 19. These three portions extend beyond the circumference of the lower half of the idler wheel 19 to serve as a guide for the chain track 11 and to also protect the track from damage due to introduction of foreign objects such as stone or the like.

As previously mentioned, the assembly 12 is slidable with respect to the frame 10, and the recoil mechanism 13 resiliently biases the assembly 12 in the forward direction with respect to the tractor. Thus the mechanism 13 maintains a tension on the chain track 11 but permits the track 11 to contract to accommodate different driving conditions. Normally, when a chain track is placed under high tension, the chain tends to buckle between the idler wheel 19 and the roller 21, and this subjects the chain track to conditions conducive to damage. In the present instance, since the idler wheel 19 and the roller 21 are mounted in a manner to provide a fixed distance between their centers even when the track is subject to recoil, so buckling is no longer a problem. The recoil mechanism 13 is shown in FIG. 2 to include the cylinder 43 for housing a compression spring 44. A piston rod 46 extends from the housing 43 and is influenced by the spring 44 to extend and retract from the housing 43. The piston 46 is connected to the assembly 12 by means of a pin 47 connected to the ears 48 which are attached to the angle piece 28 of the mounting means or bracket 22. Of course the recoil mechanism 13 may also be of a well known gas or other fluid type to act as an accumulator for the force of recoil produced on the assembly 12 by the tension in the chain track 11. The entire arrangement is also of a nature so that wear in the chain track 11 will be accommodated by the extension of the recoil mechanism 13 and the consequent forward displacement of the assembly 12.

Of course the drawings also show that the recoil mechanism 13 is secured to the track frame 10 by means of the feet 49 and screws 51 which connect to the frame members 14 so that the spring 44 and other resilient means, which may be included in the cylinder 43, resiliently bias the assembly 12 in the forward direction. Also, nuts 52 are shown threaded on the idler wheel shaft 31 to form the connection between the idler wheel 19 and the mounting bracket 22.

With reference to FIG. 1, it will be noted that the idler wheel 21 is located substantially half-way between the axis of the idler wheel 19 and the roller 16 adjacent the roller 21. The roller 21 is therefore closer to the circumference of the idler wheel 19 than it is to the circumference of the roller 16 when the chain track is taut. This provides for good prevention of the buckling of the track chain 11 as described. Further, it will be noted that the rear limit of the circumference of the idler wheel 19 falls on a vertical plane which includes the roller 21.

While a specific embodiment of this invention has been shown and described, it should be obvious that certain changes could be made in the embodiment and the invention should therefore be determined only by the scope of the appended claims.

What is claimed is:

1. An idler and roller mounting for supporting the endless chain track of a crawler tractor, comprising a frame member, a mounting bracket slidably connected to said frame member and disposed in a load-bearing relation to said frame member, an idler wheel and a first roller both rotatably supported on said mounting bracket and being slidable therewith as a unit and being disposed in tandem for supporting the chain track, said idler wheel being larger in diameter than said first roller, a plurality of additional rollers rotatably mounted on said frame member and being aligned with said idler wheel and said first roller for supporting the chain track, and a resilient member operatively connected to said mounting bracket for yieldingly urging the latter in a direction to maintain the chain track taut, said first roller being located on said mounting bracket to be normally disposed closer to said idler wheel than to the adjacent one of said additional rollers when said resilient member is maintaining the chain track taut.

2. An idler and roller mounting for supporting the endless chain track of a crawler tractor, comprising a frame member, a mounting bracket slidably connected to said frame member and disposed in a load-bearing relation to said frame member, an idler wheel and a roller both rotatably supported at spaced-apart fixed centers on said mounting bracket and being slidable therewith as a unit and being disposed in tandem for supporting the chain track, said roller being smaller in diameter than said idler wheel and being disposed to be in the plane of the vertical projection of the edge of said idler wheel adjacent said roller, and a resilient member operatively connected to said mounting bracket for yieldingly urging the latter in a direction to maintain the chain track taut.

3. An idler wheel and roller mounting for supporting the endless chain track of a crawler tractor, comprising tractor frame means, a mounting bracket slidably connected to said frame means and disposed thereon in a load-bearing relation to said frame means, said bracket including spaced-apart plates, an idler wheel and a roller both rotatably supported in tandem on said mounting bracket and intermediate said spaced-apart plates for supporting said chain track and being displaceable along with the sliding movement of said mounting bracket, said roller being smaller in diameter than said idler wheel and being disposed to be in the plane of the vertical projection of the edge of said idler wheel adjacent said roller, and resilient means connected to said mounting bracket for yieldingly urging the latter in a direction to maintain said chain track taut.

4. An idler wheel and roller mounting for supporting the endless chain track of a crawler tractor having chain-supporting rollers, comprising tractor frame means, a mounting bracket slidably connected to said frame means and disposed thereon in a load-bearing relation to the lower side of said frame means to support the latter from underneath, said bracket including spaced-apart plates arranged to serve as lateral guides for said chain track and being displaceable along with the sliding movement of said mounting bracket, an idler wheel and a roller both rotatably supported in tandem on said mounting bracket and intermediate said spaced-apart plates for supporting said chain track and being displaceable along with the sliding movement of said mounting bracket, said plates flanking both sides of both of said idler wheel and said roller and extending between points overlapping diametrically opposite halves of said idler wheel and said roller with respect to each other, and resilient means connected to said mounting bracket for yieldingly urging the latter in a direction to maintain said chain track taut.

References Cited
UNITED STATES PATENTS

| | | | |
|---|---|---|---|
| 1,571,628 | 2/1926 | Hendrickson | 305—31 X |
| 2,125,531 | 8/1938 | Weeks | 305—32 X |

BENJAMIN HERSH, *Primary Examiner.*

RICHARD J. JOHNSON, *Examiner.*